(12) United States Patent
Hale et al.

(10) Patent No.: US 9,942,597 B2
(45) Date of Patent: Apr. 10, 2018

(54) HYBRID ELECTRONIC PROGRAMMING GUIDE

(71) Applicant: EchoStar Technologies, LLC, Englewood, CO (US)

(72) Inventors: Jeffrey Hale, Littleton, CO (US); David Ogarek, Greenwood Village, CO (US)

(73) Assignee: Echostar Technologies L.L.C., Englewood, CO (US)

(*) Notice: Subject to any disclaimer, the term of this patent is extended or adjusted under 35 U.S.C. 154(b) by 0 days.

(21) Appl. No.: 14/303,423

(22) Filed: Jun. 12, 2014

(65) Prior Publication Data

US 2015/0074725 A1 Mar. 12, 2015

Related U.S. Application Data

(60) Provisional application No. 61/834,286, filed on Jun. 12, 2013.

(51) Int. Cl.
| | |
|---|---|
| *H04N 21/434* | (2011.01) |
| *H04N 21/4623* | (2011.01) |
| *H04N 21/482* | (2011.01) |
| *H04N 21/426* | (2011.01) |
| *H04N 21/61* | (2011.01) |
| *H04N 21/462* | (2011.01) |

(52) U.S. Cl.
CPC ..... *H04N 21/4263* (2013.01); *H04N 21/4345* (2013.01); *H04N 21/4622* (2013.01); *H04N 21/4623* (2013.01); *H04N 21/4821* (2013.01); *H04N 21/6143* (2013.01)

(58) Field of Classification Search
CPC .......... H04N 21/4345; H04N 21/4623; H04N 21/4821; H04N 21/6143; H04N 21/4622; H04N 21/4263

See application file for complete search history.

(56) References Cited

U.S. PATENT DOCUMENTS

| | | | | |
|---|---|---|---|---|
| 6,081,263 A * | 6/2000 | LeGall | .................. | G06F 9/4443 348/E5.105 |
| 8,707,376 B1 * | 4/2014 | Hannum | ...................... | 386/324 |
| 2003/0124973 A1 * | 7/2003 | Sie | .......................... | G06Q 30/02 455/2.01 |
| 2005/0125828 A1 * | 6/2005 | Fujiwara | ............ | H04N 5/44543 725/60 |
| 2009/0144768 A1 * | 6/2009 | Nagaraja | ............ | H04N 5/44543 725/39 |
| 2013/0305287 A1 * | 11/2013 | Wong | ................... | H04N 21/482 725/42 |
| 2014/0130099 A1 * | 5/2014 | Kunisetty | .......... | H04N 21/4667 725/50 |

* cited by examiner

*Primary Examiner* — Nathan Flynn
*Assistant Examiner* — Christine Kurien
(74) *Attorney, Agent, or Firm* — Kilpatrick Townsend & Stockton LLP

(57) ABSTRACT

A hybrid, expandable electronic programming guide that may allow broadcast programming customers to view both broadcast programming options and over-the-top service options in a single electronic programming guide.

20 Claims, 12 Drawing Sheets

| | | FRI, MAR 21 | | 10:56AM |
|---|---|---|---|---|
| DVR RECORDINGS | | | | |

USED: 84%

| PROGRAM NAME | DATE | TIME | DURATION | STATUS |
|---|---|---|---|---|
| MEET THE STEWARTS | 03/12/2014 | 01:10PM | 1:44:56 | |
| THE TONIGHT SHOW STARRING JIMMY...(10) | | | | |
| LATE NIGHT WITH SETH MEYERS (4) | | | | |
| THE GOOD WIFE (2) | | | | |
| SATURDAY NIGHT LIVE (3) | | | | |
| THE MENTALIST | 02/23/2014 | 07:58PM | 1:01:59 | |
| *NEW* OLYMPICS 2014 PRIMETIME: CLOSING CER... | 02/23/2014 | 07:28PM | 2:09:59 | |
| *NEW* 60 MINUTES | 02/23/2014 | 05:58PM | 1:03:55 | |

FIG. 11

HYBRID ELECTRONIC PROGRAMMING GUIDE

CROSS REFERENCE TO RELATED APPLICATION

This application claims priority to U.S. provisional patent application Ser. No. 61/834,286 filed 12 Jun. 2013 and entitled HYBRID ELECTRONIC PROGRAMMING GUIDE, the entirety of which is hereby incorporated by reference for all intents and purposes.

BACKGROUND

The advent of the digital video recorder and the availability of high-capacity and affordable computer-readable storage devices have made available many possibilities to television programming service providers and viewers alike. In recent years, television viewers have come to expect the ability to customize, manage, and have access to various types of content via their television receivers.

SUMMARY

In an aspect, a computer-implemented method may include or comprise outputting for presentation by a display device and within an interactive electronic programming guide a continuously updated menu of programming provided to at least one television receiver by at least one broadcast programming provider. The method may further include or comprise simultaneously outputting for presentation by the display device and within the interactive electronic programming guide a continuously updated menu of over-the-top (OTT) content provided to the at least one television receiver by at least one OTT service provider.

In an aspect, a television receiver may include or comprise one or more processors and a memory communicatively coupled with and readable by the one or more processors and having stored therein processor-readable instructions. The instructions may when executed by the one or more processors cause the one or more processors to output for presentation by a display device and within an interactive electronic programming guide a continuously updated menu of programming provided to the television receiver by at least one broadcast programming provider. The instructions may when executed by the one or more processors cause the one or more processors to simultaneously output for presentation by the display device and within the interactive electronic programming guide a continuously updated menu of over-the-top (OTT) content provided to the television receiver by at least one OTT service provider.

In an aspect, a computer-implemented method may include or comprise outputting for presentation by a display device and within an interactive electronic programming guide a continuously updated menu of programming provided to at least one television receiver by at least one broadcast programming provider. The method may further include or comprise simultaneously outputting for presentation by the display device and within the interactive electronic programming guide a continuously updated menu of over-the-top (OTT) content provided to the at least one television receiver by at least one OTT service provide. The method may further include or comprise monitoring selection of an icon associated with the at least one OTT service provider within the interactive electronic programming guide. The method may further include or comprise intermittently or periodically reporting based on the monitoring OTT service provider selection data to a computing system associated with a satellite television service provider over a broadband connection.

DESCRIPTION OF THE DRAWINGS

FIG. 11 shows a DVR recordings screen accessible from the guide of FIG. 8.

DETAILED DESCRIPTION

The present disclosure is drawn to or towards a hybrid, expandable EPG (Electronic Programming Guide) that may allow broadcast programming customers to view both broadcast programming options and OTT (Over-The-Top) service options in a single EPG. Further, the EPG may allow users to expand OTT service options to show "sub-options" within the same EPG, and also allow users to access OTT websites to view and access content as desired. Such an EPG may, among other things, serve to entice new customers to subscribe to services as offered by a particular satellite television provider, as well as provide an incentive for existing customers to maintain their loyalty and/or relationship with the particular satellite television provider. Although not so limited, an appreciation of the various aspects of the present disclosure may be gained from the following discussion in connection with the drawings.

Figure 1:
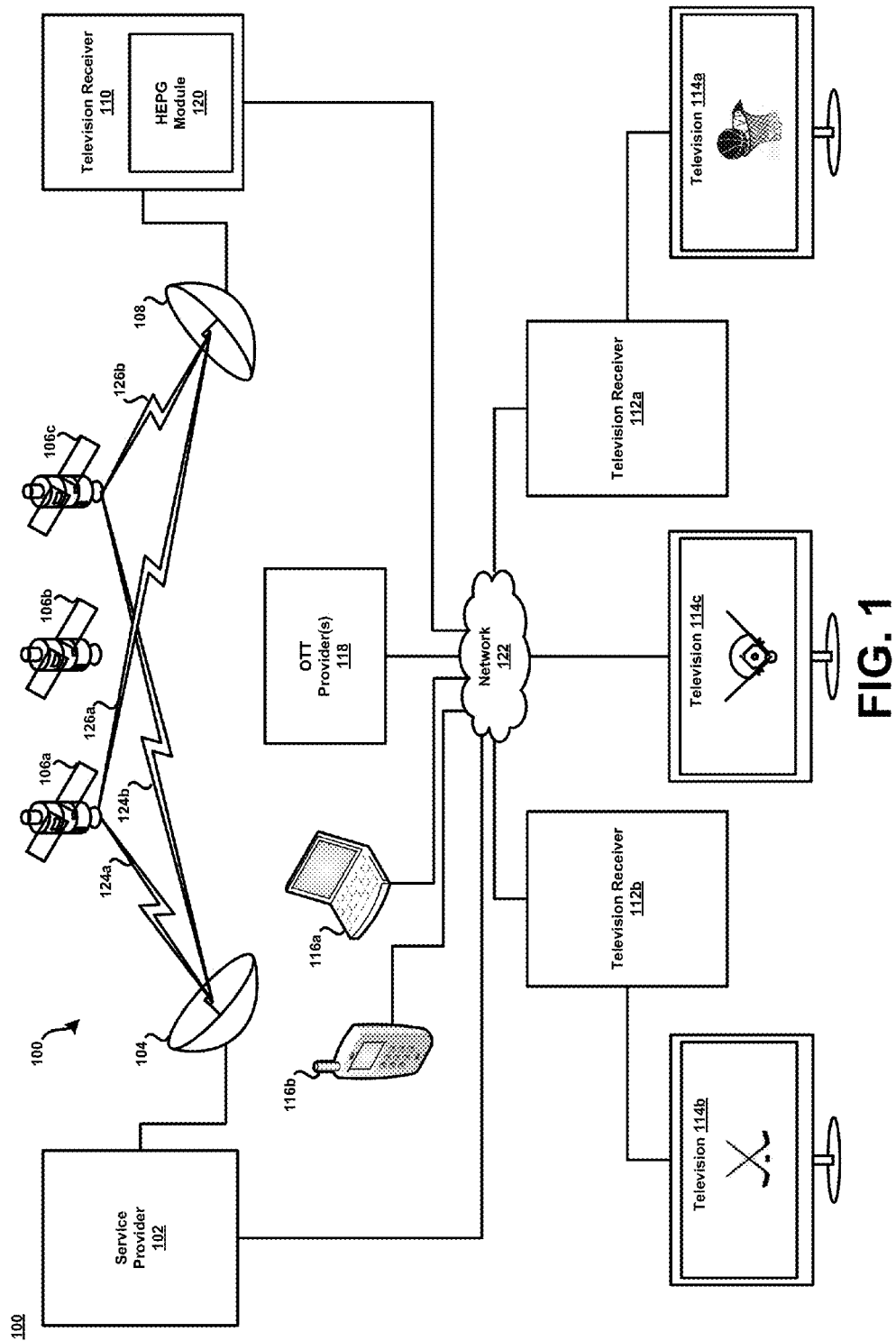
FIG. 1 shows an example satellite system in accordance with the disclosure.

Referring now to FIG. 1, an example satellite television distribution system 100 is shown in accordance with the present disclosure. For brevity, the system 100 is depicted in a simplified form, and may include more or fewer systems, devices, networks, and etc., as desired. Further, number and type of features or elements incorporated within the system 100 may or may not be implementation-specific, and at least some of the aspects of the system 100 may be similar to a cable television distribution system, an IPTV (Internet Protocol Television) content distribution system, and/or any other type of media content distribution system as desired.

The example system 100 may include a service provider 102, a satellite uplink 104, a plurality of satellites 106*a-c*, a satellite dish 108, a PTR (Primary Television Receiver) 110, a plurality of STRs (Secondary Television Receivers) 112*a-b*, a plurality of televisions 114*a-c*, a plurality of computing devices 116*a-b*, and at least one server 118 associated with a particular OTT service provider. In the present example, the PTR 110 may include an HEPG (Hybrid Electronic Programming Guide) module 120. In general, the HEPG module 120 may be configured and arranged to output for display on a television or mobile device, for example, a continuously updated guide or menu of available broadcast programming and OTT content for display thereon. Such an example implementation may be beneficial and/or advantageous in many respects. For example, the hybrid EPG of the present disclosure is uncomplicated and elegant, and may allow the consumer the ease to view all their content in the EPG, either their broadcast channels or OTT content, without switching TV input. Additionally, for content providers, the hybrid EPG may provide visibility to their content and thus advertising revenue possibilities. Still other benefits and/or advantages are possible as well, and an appreciation of the same may be gained in light of the disclosure in its entirety.

The system 100 may further include at least one network 122 that establishes a bidirectional communication path for data transfer between and among each respective element of the system 100, outside or separate from the unidirectional satellite signaling path. The network 122 is intended to represent any number of terrestrial and/or non-terrestrial network features or elements. For example, the network 122 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, or any other type of communication network configured such that data may be transferred between and among respective elements of the system 100.

The PTR 110, and the STRs 112*a-b*, as described throughout may generally be any type of television receiver, television converter, etc., such as a STB (Set-Top-Box) for example. In another example, the PTR 110, and the STRs 112*a-b*, may exhibit functionality integrated as part of or into a television, a DVR, a computer such as a tablet computing device, or any other computing system or device, as well as variations thereof. Further, the PTR 110, and the STRs 112*a-b*, may be configured and/or arranged to receive content via terrestrial (e.g., OTA) means and/or non-terrestrial means (e.g., satellites). Still further, the PTR 110 and the network 122, together with the STRs 112*a-b* and televisions 114*a-c*, and possibly the computing devices 116*a-b*, may each be incorporated within or form at least a portion of a particular home computing network.

Further, the PTR 110 may be configured so as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-bandwidth Digital Content Protection), etc. Other embodiments are possible. For example, one or more of the various elements or components of the example system 100 may be configured to communicate in accordance with the MoCA® (Multimedia over Coax Alliance) home entertainment networking standard. Still other embodiments are possible.

In practice, the satellites 106*a-c* may each be configured to receive uplink signals 226*a-c* from the satellite uplink 104. In this example, each the uplink signals 124*a-c* may contain one or more transponder streams of particular data or content, such as one or more particular television channels, as supplied by the service provider 102. For example, each of the respective uplink signals 124*a-c* may contain various media content such as encoded HD (High Definition) television channels, SD (Standard Definition) television channels, on-demand programming, programming information, and/or any other content in the form of at least one transponder stream, and in accordance with an allotted carrier frequency and bandwidth. In this example, different media content may be carried using different ones of the satellites 106*a-c*.

Further, different media content may be carried using different transponders of a particular satellite (e.g., satellite 106*a*); thus, such media content may be transmitted at different frequencies and/or different frequency ranges. For example, a first and second television channel may be carried on a first carrier frequency over a first transponder of satellite 106*a*, and a third, fourth, and fifth television channel may be carried on second carrier frequency over a first transponder of satellite 106*b*, or, the third, fourth, and fifth television channel may be carried on a second carrier frequency over a second transponder of satellite 106*a*, and etc. Each of these television channels may be scrambled such that unauthorized persons are prevented from accessing the television channels.

The satellites 106*a-c* may further be configured to relay the uplink signals 124*a-c* to the satellite dish 108 as downlink signals 126*a-c*. Similar to the uplink signals 124*a-c*, each of the downlink signals 126*a-c* may contain one or more transponder streams of particular data or content, such as various encoded and/or at least partially electronically scrambled television channels, on-demand programming, etc., in accordance with an allotted carrier frequency and bandwidth. The downlink signals 126*a-c*, however, may not necessarily contain the same or similar content as a corresponding one of the uplink signals 124*a-c*. For example, the uplink signal 124*a* may include a first transponder stream containing at least a first group or grouping of television channels, and the downlink signal 126*a* may include a second transponder stream containing at least a second, different group or grouping of television channels. In other examples, the first and second group of television channels may have one or more television channels in common. In sum, there may be varying degrees of correlation between the uplink signals 124*a-c* and the downlink signals 126*a-c*, both in terms of content and underlying characteristics.

Further, satellite television signals may be different from broadcast television or other types of signals. Satellite signals may include multiplexed, packetized, and modulated digital signals. Once multiplexed, packetized and modulated, one analog satellite transmission may carry digital data representing several television stations or service providers. Some examples of service providers include HBO®, CBS®, ESPN®, and etc. Further, the term "channel," may in some contexts carry a different meaning from or than its normal plain language meaning. For example, the term "channel" may denote a particular carrier frequency or sub-band which can be tuned to by a particular tuner of a television receiver. In other contexts though, the term "channel" may refer to a single program/content service such as HBO®.

Additionally, a single satellite may typically have multiple transponders (e.g., 32 transponders) each one broadcasting a channel or frequency band of about 24-27 MHz in a broader frequency or polarity band of about 500 MHz. Thus, a frequency band of about 500 MHz may contain numerous sub-bands or channels of about 24-27 MHz, and each channel in turn may carry a combined stream of digital data comprising a number of content services. For example, a particular hypothetical transponder may carry HBO®, CBS®, ESPN®, plus several other channels, while another particular hypothetical transponder may itself carry 3, 4, 5, 6, etc., different channels depending on the bandwidth of the particular transponder and the amount of that bandwidth occupied by any particular channel or service on that transponder stream. Further, in many instances a single satellite may broadcast two orthogonal polarity bands of about 500 MHz. For example, a first polarity band of about 500 MHz broadcast by a particular satellite may be left-hand circular polarized, and a second polarity band of about 500 MHz may be right-hand circular polarized. Other embodiments are possible.

Continuing with the example scenario, the satellite dish 108 may be provided for use to receive television channels (e.g., on a subscription basis) provided by the service provider 102, satellite uplink 104, and/or satellites 106a-c. For example, the satellite dish 108 may be configured to receive particular transponder streams, or downlink signals 126a-c, from one or more of the satellites 106a-c. Based on the characteristics of the PTR 110 and/or satellite dish 108, however, it may only be possible to capture transponder streams from a limited number of transponders concurrently. For example, a particular tuner of the PTR 110 may be configured to tune to a single transponder stream from a transponder of a single satellite at a time.

Additionally, the PTR 110, which is communicatively coupled to the satellite dish 108, may subsequently select via tuner, decode, and relay particular transponder streams to at least the television 114c for display thereon. For example, the satellite dish 108 and the PTR 110 may, respectively, be configured to receive, decode, and relay at least one premium HD-formatted television channel to the television 114c. Programming or content associated with the HD channel may generally be presented live, or from a recording as previously stored on, by, or at the PTR 110. Here, the HD channel may be output to the television 114c in accordance with the HDMI/HDCP content protection technologies. Other embodiments are however possible.

Further, the PTR 110 may select via tuner, decode, and relay particular transponder streams to one or both of the STRs 112a-b, which may in turn relay particular transponder streams to a corresponding one of the televisions 114a-b for display thereon. For example, the satellite dish 108 and the PTR 110 may, respectively, be configured to receive, decode, and relay at least one television channel to the television 114a by way of the STR 112a. Similar to the above-example, the television channel may generally be presented live, or from a recording as previously stored on the PTR 110, and may be output to the television 114a by way of the STR 112a in accordance with a particular content protection technology and/or networking standard. Still further, the satellite dish 108 and the PTR 110 may, respectively, be configured to receive, decode, and relay at least one premium television channel to one or both of the computing device 116a-b. Similar to the above-examples, the television channel may generally be presented live, or from a recording as previously stored on the PTR 110, and may be output to one or both of the computing devices 116a-b in accordance with a particular content protection technology and/or networking standard.

Figure 2:
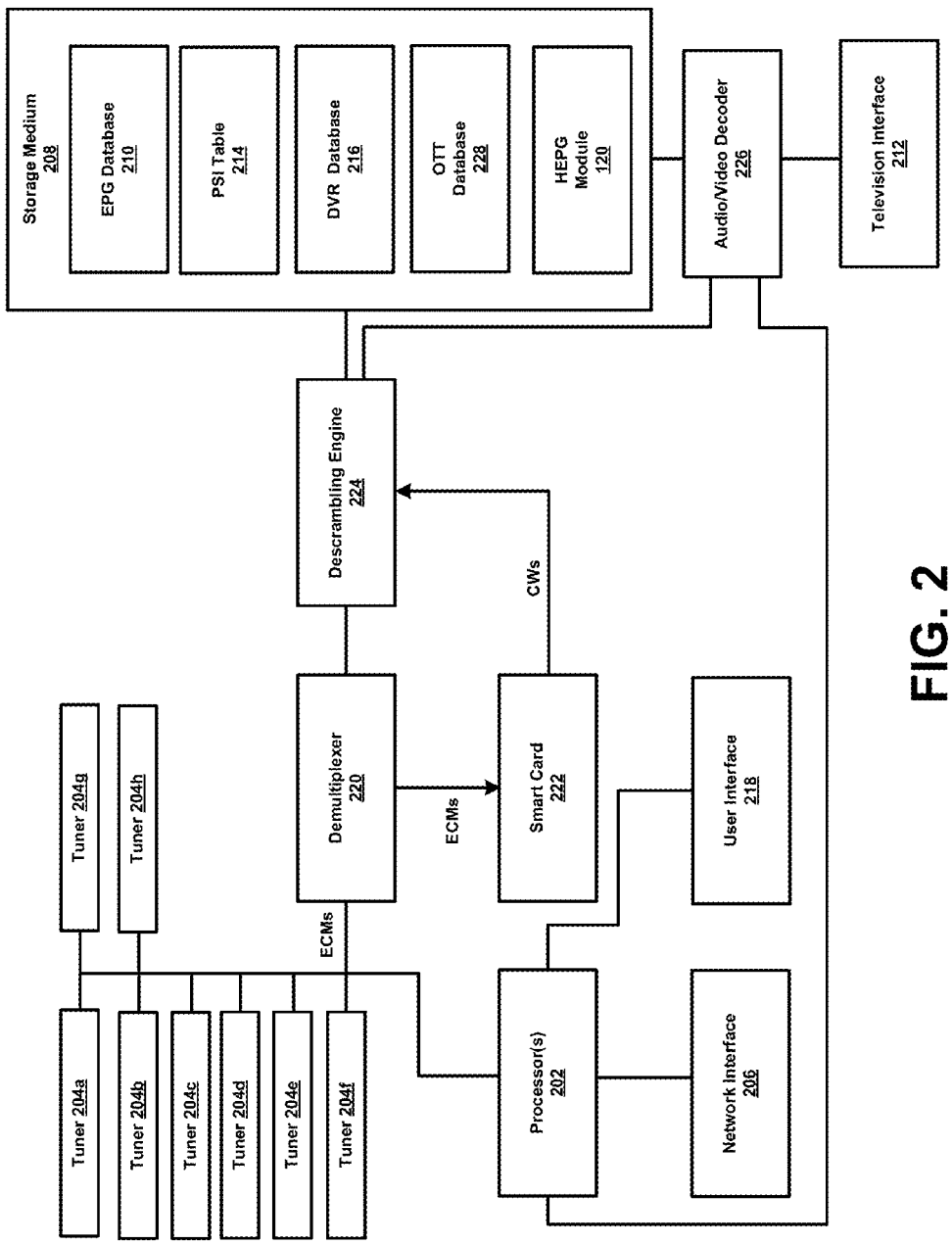
FIG. 2 shows an example block diagram of a television receiver of FIG. 1.

Referring now to FIG. 2, an example block diagram of the PTR 110 of FIG. 1 is shown in accordance with the disclosure. In some embodiments, the STRs 212a-b may be configured in a manner similar to that of the PTR 110. In some embodiments, the STRs 212a-b may be configured and arranged to exhibit a reduced functionality as compared to the PTR 110, and may depend at least to a certain degree on the PTR 110 to implement certain features or functionality. The STRs 212a-b in this example may be each referred to as a "thin client."

The PTR 110 may include one or more processors 202, a plurality of tuners 204a-h, at least one network interface 206, at least one non-transitory computer-readable storage medium 208, at least one EPG database 210, at least one television interface 212, at least one PSI (Program Specific Information) table 214, at least one DVR database 216, at least one user interface 218, at least one demultiplexer 220, at least one smart card 222, at least one descrambling engine 224, and at least one decoder 226. In other embodiments, fewer or greater numbers of components may be present. For example, the PTR 110 is shown in FIG. 2 to include the HEPG module 120 as mentioned in connection with FIG. 1. Further, functionality of one or more components may be combined; for example functions of the descrambling engine 224 may be performed by the processors 202. Still further, functionality of components may be distributed among additional components, and possibly additional systems such as, for example, in a cloud-computing implementation.

The processors 202 may include one or more specialized and/or general-purpose processors configured to perform processes such as tuning to a particular channel, accessing and displaying EPG information, and/or receiving and processing input from a user. For example, the processors 202 may include one or more processors dedicated to decoding video signals from a particular format, such as according to a particular MPEG (Motion Picture Experts Group) standard, for output and display on a television, and for performing or at least facilitating decryption or descrambling.

The tuners 204a-h may be used to tune to television channels, such as television channels transmitted via satellites 206a-c. Each one of the tuners 204a-h may be capable of receiving and processing a single stream of data from a satellite transponder, or a cable RF channel, at a given time. As such, a single tuner may tune to a single transponder or, for a cable network, a single cable channel. Additionally, one tuner (e.g., tuner 204a) may be used to tune to a television channel on a first transponder stream for display using a television, while another tuner (e.g., tuner 204b) may be used to tune to a television channel on a second transponder for recording and viewing at some other time. If multiple television channels transmitted on the same transponder stream are desired, a particular tuner (e.g., tuner 204c) may be used to receive the signal containing the multiple television channels for presentation and/or recording of each of the respective multiple television channels, such as in a PTAT (Primetime Anytime) implementation for example. Although eight tuners are shown, the PTR 110 may include more or fewer tuners (e.g., three tuners, twelve tuners, etc.), and the features of the disclosure may be implemented similarly and scale according to the number of tuners of the PTR 110.

The network interface 206 may be used to communicate via alternate communication channel(s) with a service provider(s) and/or OTT provider(s). For example, the primary communication channel between the service provider 102 of FIG. 1 and the PTR 110 may be via satellites 206a-c, which may be unidirectional to the PTR 110, and another communication channel between the service provider 102 and/or OTT service provider 118 and the PTR 110, which may be bidirectional, via the network 122. In general, various types of information may be transmitted and/or received via the network interface 206.

The storage medium 208 may represent a non-transitory computer-readable storage medium. The storage medium 208 may include memory and/or a hard drive. The storage medium 208 may be used to store information received from one or more satellites and/or information received via the network interface 206. For example, the storage medium 208 may store information related to the EPG database 210, the PSI table 214, and/or the DVR database 216, among other elements or features, such as the HEPG module 120 mentioned above, and an OTT database 228 as discussed in further detail below. Recorded television programs may be stored using the storage medium 208.

The EPG database 210 may store information related to television channels and the timing of programs appearing on such television channels. Information from the EPG database 210 may be used to inform users of what television channels or programs are available, popular and/or provide recommendations. Information from the EPG database 210 may be used to generate a visual interface displayed by a television that allows a user to browse and select television channels and/or television programs for viewing and/or recording. Information used to populate the EPG database 210 may be received via the network interface 206 and/or via satellites 106a-c of FIG. 1. For example, updates to the EPG database 210 may be received periodically via satellite. The EPG database 210 may serve as an interface for a user to control DVR functions of the PTR 110, and/or to enable viewing and/or recording of multiple television channels simultaneously.

The decoder 226 may convert encoded video and audio into a format suitable for output to a display device. For instance, the decoder 226 may receive MPEG video and audio from the storage medium 208, or the descrambling engine 224, to be output to a television. MPEG video and audio from the storage medium 208 may have been recorded to the DVR database 216 as part of a previously-recorded television program. The decoder 226 may convert the MPEG video and audio into a format appropriate to be displayed by a television or other form of display device and audio into a format appropriate to be output from speakers, respectively. The decoder 226 may be a single hardware element capable of decoding a finite number of television channels at a given time, such as in a time-division arrangement. In the example embodiment, eight television channels may be decoded concurrently or simultaneously.

The television interface 212 output a signal to a television, or another form of display device, in a proper format for display of video and play back of audio. As such, the television interface 212 may output one or more television channels, stored television programming from the storage medium 208, such as television programs from the DVR database 216 and/or information from the EPG database 210 for example, to a television for presentation.

The PSI table 214 may store information used by the PTR 110 to access various television channels. Information used to populate the PSI table 214 may be received via satellite, or cable, through the tuners 204a-h and/or may be received via the network interface 206 over the network 122 from the service provider 102 shown in FIG. 2. Information present in the PSI table 214 may be periodically or at least intermittently updated. Information that may be present in the PSI table 214 may include: television channel numbers, satellite identifiers, frequency identifiers, transponder identifiers, ECM PIDs (Entitlement Control Message, Packet Identifier), one or more audio PIDs, and video PIDs. A second audio PID of a channel may correspond to a second audio program, such as in another language. In some embodiments, the PSI table 214 may be divided into a number of tables, such as a NIT (Network Information Table), a PAT (Program Association Table), a PMT (Program Management Table), etc.

Table 1 below provides a simplified example of the PSI table 214 for several television channels. It should be understood that in other embodiments, many more television channels may be represented in the PSI table 214. The PSI table 214 may be periodically or at least intermittently. As such, television channels may be reassigned to different satellites and/or transponders, and the PTR 110 may be able to handle this reassignment as long as the PSI table 214 is updated.

TABLE 1

| Channel | Satellite | Transponder | ECM PID | Audio PIDs | Video PID |
|---------|-----------|-------------|---------|------------|-----------|
| 4 | 1 | 2 | 27 | 1001 | 1011 |
| 5 | 2 | 11 | 29 | 1002 | 1012 |
| 7 | 2 | 3 | 31 | 1003 | 1013 |
| 13 | 2 | 4 | 33 | 1003, 1004 | 1013 |

It should be understood that the values provided in Table 1 are for example purposes only. Actual values, including how satellites and transponders are identified, may vary. Additional information may also be stored in the PSI table 214. Video and/or audio for different television channels on different transponders may have the same PIDs. Such television channels may be differentiated based on which satellite and/or transponder to which a tuner is tuned.

DVR functionality of the PTR 110 may permit a television channel to be recorded for a period of time. The DVR database 216 may store timers that are used by the processors 202 to determine when a television channel should be tuned to and recorded to the DVR database 245 of storage medium 208. In some embodiments, a limited amount of space of the storage medium 208 may be devoted to the DVR database 216. Timers may be set by the service provider 102 and/or one or more users of the PTR 110. DVR functionality of the PTR 110 may be configured by a user to record particular television programs. The PSI table 214 may be used by the PTR 110 to determine the satellite, transponder, ECM PID, audio PID, and video PID.

The user interface 218 may include a remote control, physically separate from PTR 110, and/or one or more buttons on the PTR 110 that allows a user to interact with the PTR 110. The user interface 218 may be used to select a television channel for viewing, view information from the EPG database 210, and/or program a timer stored to the DVR database 216 wherein the timer may be used to control the DVR functionality of the PTR 110.

Referring back to the tuners 204a-h, television channels received via satellite may contain at least some encrypted or scrambles data. Packets of audio and video may be scrambled to prevent unauthorized users, such as nonsubscribers, from receiving television programming without paying the service provider 102. When one of the tuners 204a-h is receiving data from a particular transponder of a satellite, the transponder stream may be a series of data packets corresponding to multiple television channels. Each data packet may contain a PID, which in combination with the PSI table 214, can be determined to be associated with a particular television channel. Particular data packets, referred to as ECMs may be periodically transmitted. ECMs may be encrypted; the PTR 110 may use the smart card 222 to decrypt ECMs.

The smart card 222 may function as the CA (Controlled Access) which performs decryption of encryption data to obtain control words that are used to descramble video and/or audio of television channels. Decryption of an ECM may only be possible when the user (e.g., an individual who is associated with the PTR 110) has authorization to access the particular television channel associated with the ECM. When an ECM is received by the demultiplexer 220 and the ECM is determined to correspond to a television channel being stored and/or displayed, the ECM may be provided to the smart card 222 for decryption.

When the smart card 222 receives an encrypted ECM from the demultiplexer 220, the smart card 260 may decrypt the ECM to obtain some number of control words. In some embodiments, from each ECM received by the smart card 222, two control words are obtained. In some embodiments, when the smart card 222 receives an ECM, it compares the ECM to the previously received ECM. If the two ECMs match, the second ECM is not decrypted because the same control words would be obtained. In other embodiments, each ECM received by the smart card 222 is decrypted; however, if a second ECM matches a first ECM, the outputted control words will match; thus, effectively, the second ECM does not affect the control words output by the smart card 222. When an ECM is received by the smart card 222, it may take a period of time for the ECM to be decrypted to obtain the control words. As such, a period of time, such as about 0.2-0.5 seconds, may elapse before the control words indicated by the ECM can be obtained. The smart card 222 may be permanently part of the PTR 110 or may be configured to be inserted and removed from the PTR 110.

The demultiplexer 220 may be configured to filter data packets based on PIDs. For example, if a transponder data stream includes multiple television channels, data packets corresponding to a television channel that are not desired to be stored or displayed by the user may be ignored by the demultiplexer 255. As such, only data packets corresponding to the one or more television channels desired to be stored and/or displayed may be passed to either the descrambling engine 224 or the smart card 222; other data packets may be ignored. For each channel, a stream of video packets, a stream of audio packets and/or a stream of ECM packets may be present, each stream identified by a PID. In some embodiments, a common ECM stream may be used for multiple television channels. Additional data packets corresponding to other information, such as updates to the PSI table 214, may be appropriately routed by the demultiplexer 220.

The descrambling engine 224 may use the control words output by the smart card 222 in order to descramble video and/or audio corresponding to television channels for storage and/or presentation. Video and/or audio data contained in the transponder data stream received by the tuners 204a-h may be scrambled. The video and/or audio may be descrambled by the descrambling engine 224 using a particular control word. Which control word output by the smart card 222 to be used for successful descrambling may be indicated by a scramble control identifier present within the data packet containing the scrambled video or audio. Descrambled video and/or audio may be output by the descrambling engine 224 to the storage medium 208 for storage, such as part of the DVR database 216 for example, and/or to the decoder 226 for output to a television or other presentation equipment via the television interface 212.

Also shown in FIG. 2 is an OTT database 228 located on the storage medium 208. The OTT database 228 may, for example, store information related to OTT content provided to the PTR 110 by at least one OTT service provider (e.g., OTT service provider 118). Information or data from the OTT database 228 may be used to inform users of what OTT services or content are available for access to the user. Information from the OTT database 228 may provide the user with a visual interface in tandem with or separate from an EPG provided by the EPG database 210 that allows a user to browse and select OTT services or content for viewing, access, etc. Information used to populate the OTT database 228 may be received via the network interface 206 and/or satellites 106a-c of FIG. 1 via the tuners 204a-c. Other embodiments are possible.

For brevity, the PTR 110 is depicted in a simplified form, and may generally include more or fewer elements or components as desired, including those configured and/or arranged for implementing various features associated with providing a hybrid, expandable EPG that may allow broadcast programming customers to view both broadcast programming options and OTT service options in a single EPG, along with allowing users to expand OTT service options to show "sub-options" within the same EPG, and also allow users to access OTT sites to view content as desired and discussed in the context of the present disclosure. For example, the PTR 110 is shown in FIG. 2 to include the HEPG module 120 as mentioned above in connection with FIG. 1. Further, some routing between the various modules of PTR 110 has been illustrated. Such illustrations are for exemplary purposes only. The state of two modules not being directly or indirectly connected does not indicate the modules cannot communicate. Rather, connections between modules of the PTR 110 are intended only to indicate possible common data routing. It should be understood that the modules of the PTR 110 may be combined into a fewer number of modules or divided into a greater number of modules.

Additionally, although not explicitly shown in FIG. 2, the PTR 110 may include one or more logical modules configured to implement a television steaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such functionality. Further, the PTR 110 may be configured to include any number of other various components or logical modules that are implemented in hardware, software, firmware, or any combination thereof, and such components or logical modules may or may not be implementation-specific.

Figure 3:
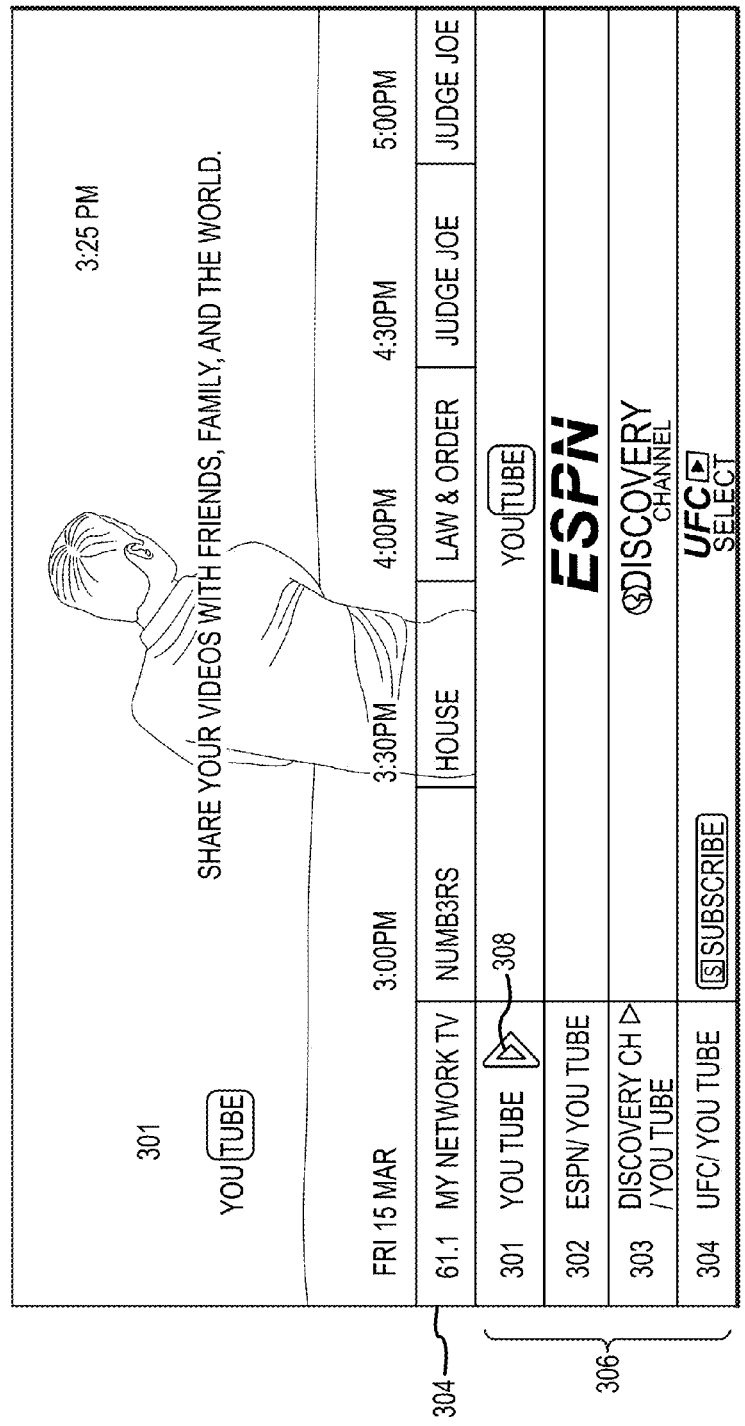
FIG. 3 shows a first example hybrid electronic programming guide.

Referring now to FIG. 3, a first example hybrid EPG 302 is shown in accordance with the present disclosure. In this example, the EPG 302 may be output by the PTR 110 to the television 114a (see e.g., FIG. 1), for example, for presentation thereon. The EPG 302 may include or display a broadcast programming pane, list, or menu 304 that shows a plurality of programming (e.g., "Numb3rs") each associated with a particular channel (e.g., "channel 61.1") that may generally be provided to the PTR 110 by the service provider 102. The EPG 302 may further include or display an interactive OTT pane, list, or menu 306 that shows a plurality of OTT service providers (e.g., "YouTube") that may generally provide content to the PTR 110 via the server(s) 118. In this example, each of the OTT service providers are associated with a particular channel (e.g., "channel 301"). The EPG 302 may thus enable a user to access OTT content in manner similar or familiar to that which may be used to traditionally access broadcast programming content. In particular, a user may scroll "up" or scroll "down" or scroll "left" or scroll "right" to view any of a number of both broadcast programming channels and OTT channels. As shown in FIG. 3, date/time information (e.g., "FRI 15 MAR" and "3:00 pm") within the EPG 302 is associated with broadcast programming content, and particular OTT channels are associated with particular channel numbers; however, specific OTT content is not displayed. While other embodiments are possible, a selectable icon 308 may be used to access the same.

Figure 4:
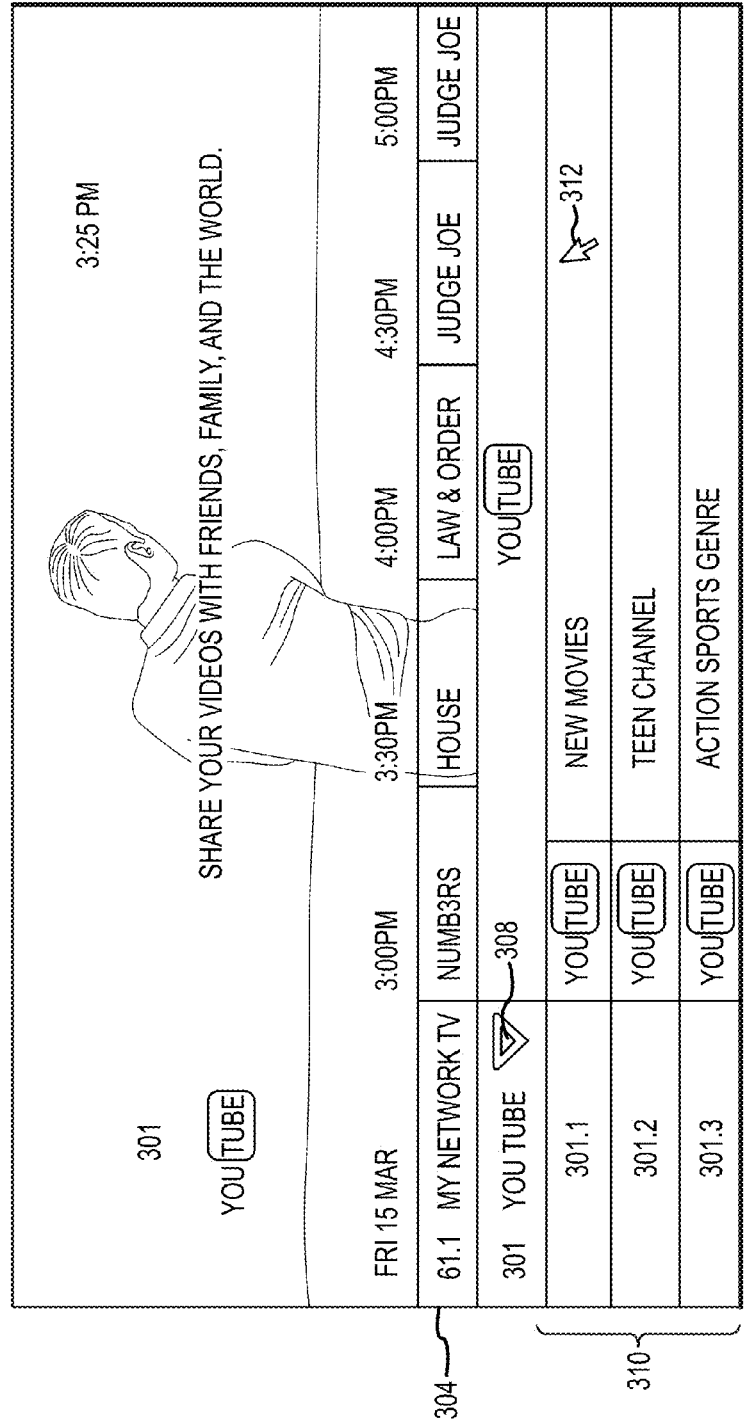
FIG. 4 shows the guide of FIG. 3 in expanded form.

For example, referring now to FIG. 4, the EPG 302 of FIG. 3 is shown in expanded form. In this example, a user may "click" on the selectable icon 308 to show an expanded interactive pane or list 310 of particular content provided by that OTT service provider. Although shown in FIG. 4 is a drop-down list, it is contemplated that there are many different ways to show or present the list 310. For example, a new window may "pop-up," other channels may be "bumped" up or "bumped" down to expose new channels, and etc. Further, the manner in which the list 310 may be exposed to the user may be implementation-specific and evolve as interactive interface technology evolves. Regardless, as shown in FIG. 4, particular content provided by the identified OTT service provider may include various sub-channels, categories and/or genres (e.g., "New Movies" associated with "channel 301.1"). This may allow users to explore OTT channel content before committing to accessing a web site associated with a particular OTT service provider, as discussed further below. Further, OTT site operators may benefit from increased exposure to new offerings, and users may appreciate the control this gives them. In this manner, the EPG 302 provides the user the opportunity to "browse" and select available content for access at will.

Figure 5:
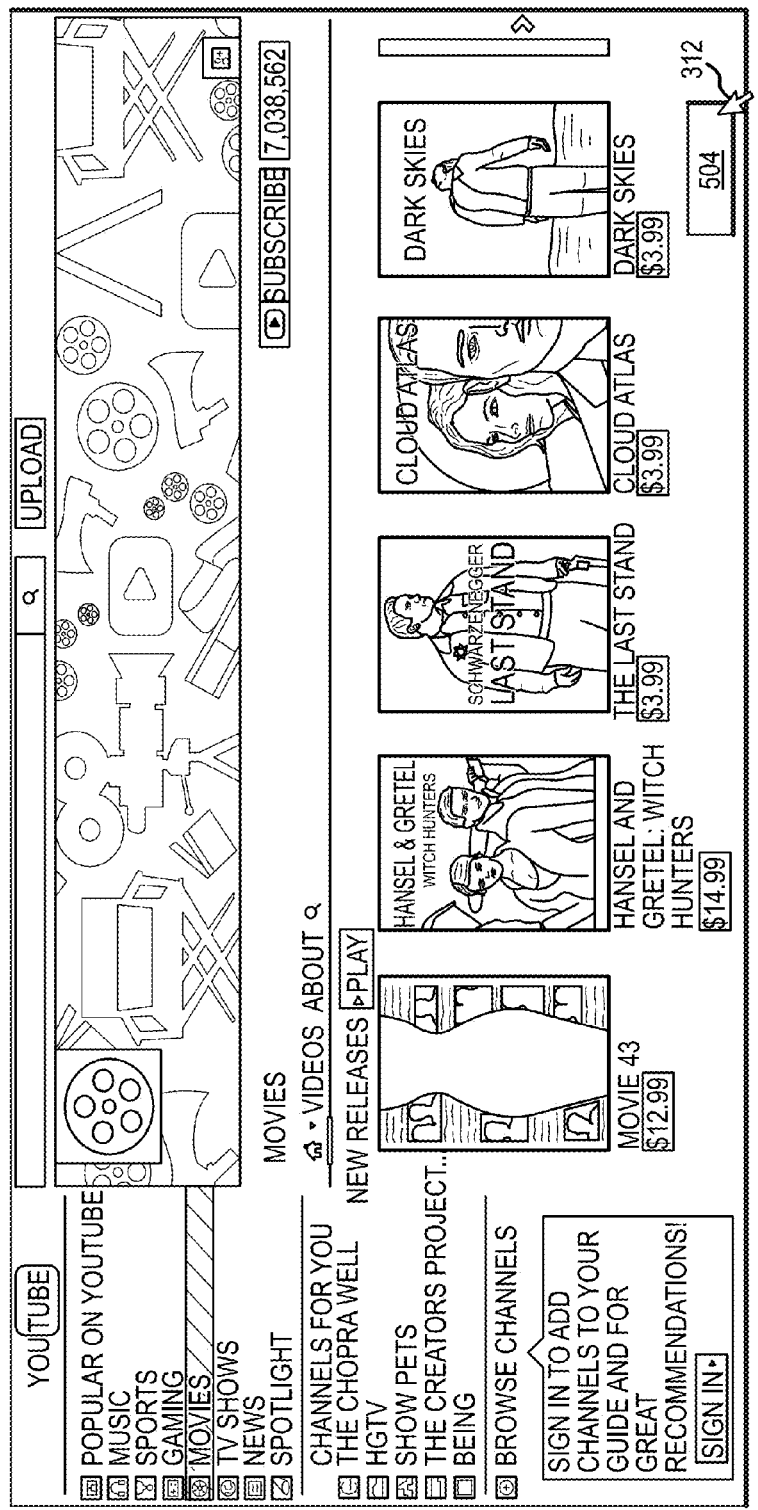
FIG. 5 shows a web page associated with a service provider.

Referring now additionally to FIG. 5, a web page 502 associated with a particular OTT services provider is shown. In this example, data associated with the web page 502 may be transferred from the OTT service provider 118, for example, to one or both of the television 114a and the PTR 110, and subsequently output by at least one of the television 114a and the PTR 110 for presentation by the television 114a. Continuing with the present example, a user may access the web page 502 by selecting "sub-channel 301.1" as shown in FIG. 4, such as by using a cursor 312 or any other selection mechanism that may be associated or consistent with a menu-driven interface, where they are then redirected to the OTT site for the "New Releases" selection which is branded by the OTT service operator. The user may navigate the web page 502 as desired, and then return to the expanded form of the EPG 302 as shown in FIG. 4 by selection of a return icon 504. It is contemplated that any of one or more particular sub-channels may be added to a user's "favorites" list. Other embodiments are possible.

Figure 6:
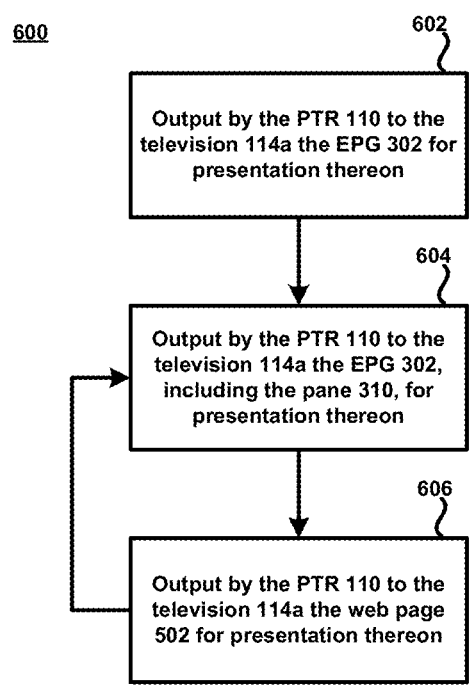
FIG. 6 shows a first example method in accordance with the present disclosure.

Referring now to FIG. 6, a first example method 600 is shown in accordance with the present disclosure. In general, the example method 600 as described may be performed on or by, wholly or at least partially, at least one computing system or device in a networked computing environment. An example of such a computing system or device and networked computing environment is discussed above in connection with at least FIG. 2, and below in connection with FIG. 12. Other embodiments are possible.

At step 602, the EPG 302 as described above in connection with at least FIGS. 3-5 may be output by the PTR 110 to the television 114a of FIG. 1, for example, for display by the television 114a. In some embodiments, the EPG 302 may include at least one a selectable icon, such as the selectable icon 308, positioned in association with a descriptor that identifies a particular OTT service provider within the EPG 302. In this manner, the PTR 110 may be configured and/or arranged to: output for presentation by a display device and within an interactive electronic programming guide a continuously updated menu of programming provided to at least one television receiver by at least one broadcast programming provider; simultaneously output for presentation by the display device and within the interactive electronic programming guide a continuously updated menu of OTT content provided to the at least one television receiver by at least one OTT service provider; and output for display within the interactive electronic programming guide a selectable icon positioned in association with a descriptor that identifies a particular OTT service provider.

At step 604, the list 310 as described above in connection with at least FIGS. 3-5 may be output by the PTR 110 to the television 114a of FIG. 1, for example, for display within the EPG 302 by the television 114a. In some embodiments, the list 310 may be output by the PTR 110 to the television 114a for display within the EPG 302 in response to user selection of the selectable icon 308. In this manner, the PTR 110 may be configured and/or arranged to generate, in response to user selection of a selectable icon and for presentation by a display device and within an interactive electronic programming guide, an interactive pane that identifies at least one instance of content provided by a particular OTT service provider.

At step 606, the web page 502 as described above in connection with at least FIGS. 3-5 may be output by the PTR 110 to the television 114a of FIG. 1, for example, for display by the television 114a. In some embodiments, the web page 502 may be output by the PTR 110 to the television 114a for display by the television 114a in response to user selection of "channel 301.1" as discussed in connection with FIG. 4. In this manner, the PTR 110 may be configured and/or arranged to: detect selection within an interactive pane of a particular instance of content provided by a particular OTT service provider; access data, provided by the particular OTT service provider to at least one television receiver over a broadband connection, associated with the particular instance of content; and outputting for presentation by a display device the data associated with the particular instance of content.

Following step 606, flow within the example method 600 may branch back to step 604. In some embodiments, flow within the example method 600 may branch back to step 604 in response to user selection of the return icon 504 as discussed in connection with FIG. 5. In this manner, the PTR 110 may be configured and/or arranged to: detect invocation of a particular command to return to an interactive pane that identifies at least one instance of content provided by a particular OTT service provider; and generate, in response to detecting invocation of the particular command and for presentation by a display device and within an interactive electronic programming guide, an interactive pane that identifies at least one instance of content provided by the particular OTT service provider.

Figure 7:
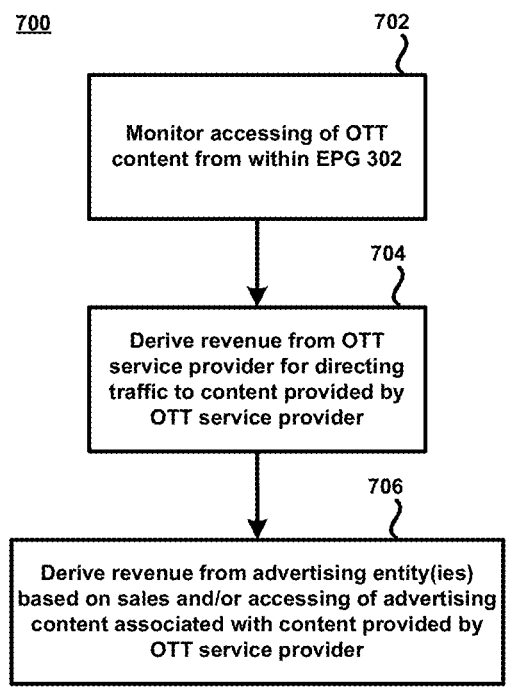
FIG. 7 shows a second example method in accordance with the present disclosure.

Referring now to FIG. 7, a second example method 700 is shown in accordance with the present disclosure. In general, the example method 700 as described may be performed on or by, wholly or at least partially, at least one computing system or device in a networked computing environment. An example of such a computing system or device and networked computing environment is discussed above in connection with at least FIG. 2, and below in connection with FIG. 12. Other embodiments are possible.

At step 702, the PTR 110 of at least FIG. 1 may monitor accessing of particular OTT content from within the EPG 302 in a manner as discussed above in connection with at least FIGS. 3-5. For example, the PTR 110 may count how many times a particular user or users associated with the PTR 110 selects "channel 301.1" to access the web page 502. At step 704, the PTR 110 may report how many times a particular user or users associated with the PTR 110 selects "channel 301.1" to access the web page 502. In this manner, a broadcast service provider (e.g., service provider 102 of FIG. 1) who provides various services via the PTR 110 may derive revenue from a particular OTT service for taking part in directing traffic to particular content provided by the particular OTT service. Similarly, at step 706, the broadcast service provider may derive revenue from an advertising entity based on perfected sales and/or accessing (e.g., "clicking") of advertising content associated with content provided by the particular OTT service provider. In general, such sales and/or accessing of advertising content may be monitored by one or more of the broadcast service provider, particular OTT service, and advertising entity so as to arrive at a quantitative figure(s) regarding sales and/or accessing of advertising content.

Figure 8:
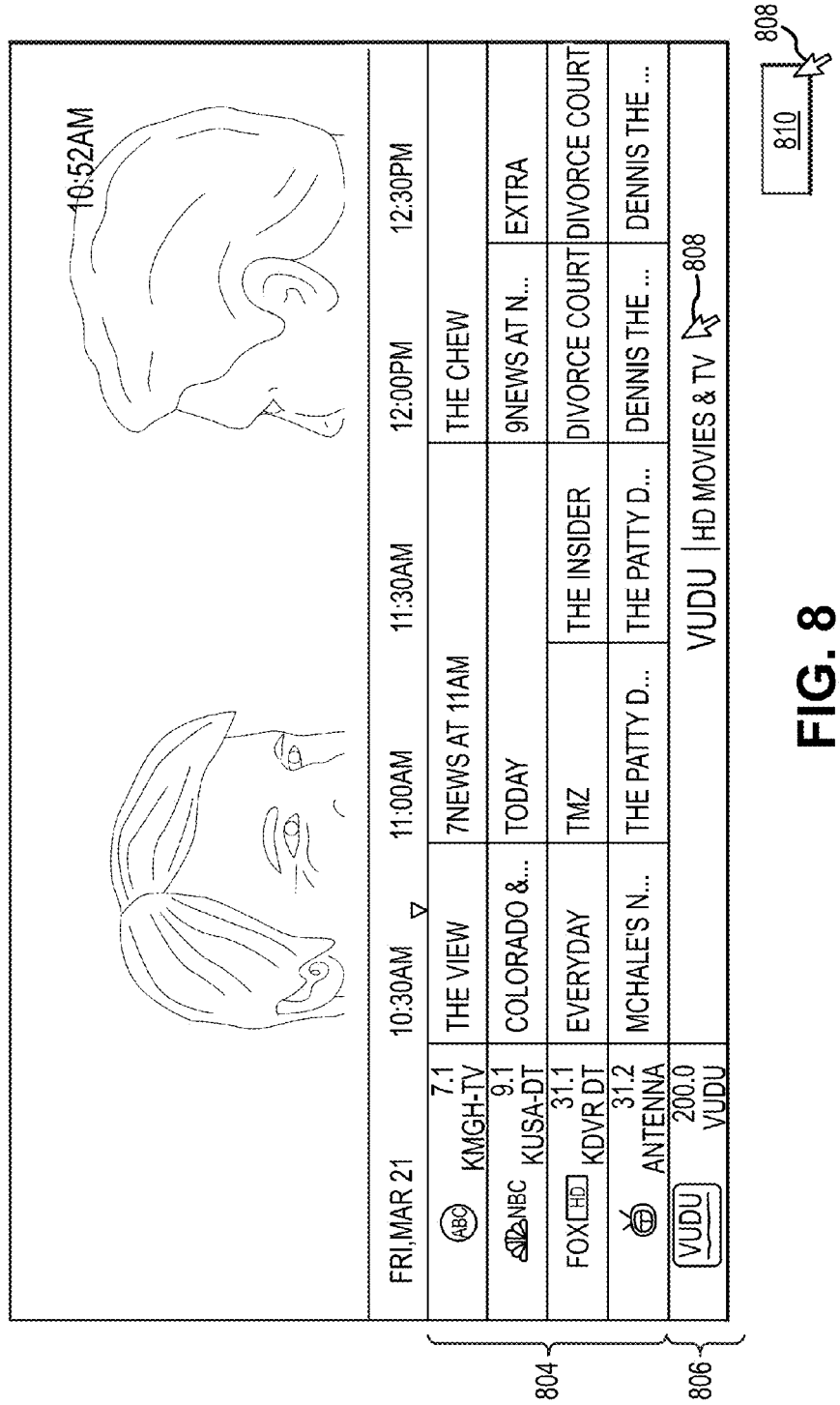
FIG. 8 shows a second example hybrid electronic programming guide.

Referring now to FIG. 8, a second example hybrid EPG 802 is shown in accordance with the present disclosure. Similar to the EPG 302 of FIG. 3, the EPG 802 may be output by the PTR 110 to the television 114b of FIG. 1, for example, for presentation thereon. The EPG 802 may include or display a broadcast programming pane, list, or menu 804 that shows a plurality of satellite or OTA (Over-The-Air) programming (e.g., "The View" or "Dennis the Menace") each associated with a particular channel (e.g., "channel 7.1" or "channel 31.2") that may generally be provided to the PTR 110 by the service provider 102 or another provider. The EPG 302 may further include or display an interactive OTT pane, list, or menu 806 that shows at least one OTT service provider (e.g., "Vudu") that may generally provide content to the PTR 110 via the server(s) 118 over the network 122 as shown in FIG. 1. While the broadcast programming pane, list, or menu 804 is itemized as separate from the interactive OTT pane, list, or menu 806, both of the same are contained within the same interface, i.e., the EPG 802.

In this example, the least one OTT service provider is associated with a particular channel (e.g., "channel 200.0"). The EPG 802 may thus enable a user to access OTT content in manner similar or familiar to that which may be used to traditionally access broadcast programming content. In particular, a user may scroll "up" or scroll "down" or scroll "left" or scroll "right" to view any of a number of both broadcast programming channels and OTT channels. As shown in FIG. 8, date/time information (e.g., "Fri, Mar 21" and "10:30 am") within the EPG 802 is associated with broadcast programming content, and particular OTT channels are associated with particular channel numbers; however, no specific OTT content is displayed. While other embodiments are possible, it is contemplated that the OTT application (e.g. "Vudu") as listed within the EPG 802 may be launched directly from the guide without having to switch to a different interface or screen.

Figure 9:
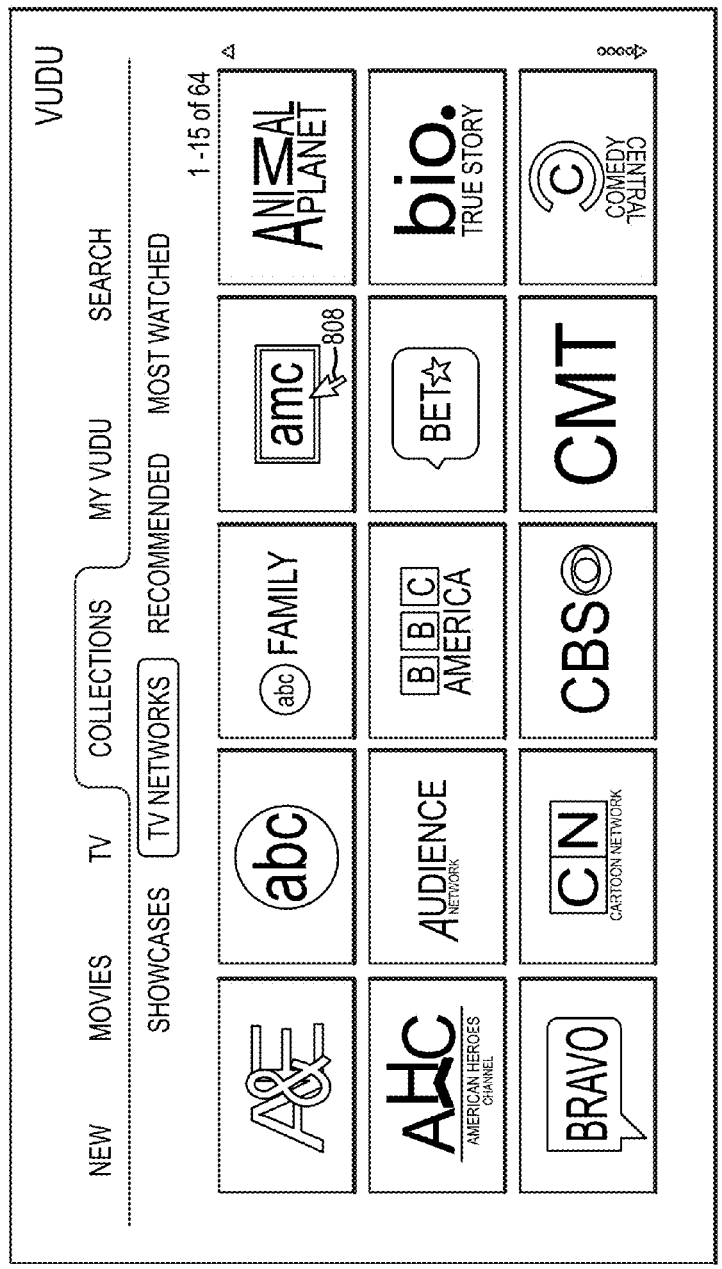
FIG. 9 shows a first screen associated with a service provider application.

For example, referring additionally to FIG. 9, an interface 902 associated with a particular OTT services provider (i.e., "Vudu") is shown. In this example, data associated with the interface 902 may be transferred from the OTT service provider 118, for example, to one or both of the television 114b and the PTR 110, and subsequently output by at least one of the television 114b and the PTR 110 for presentation by the television 114a. Continuing with the present example, a user may access the interface 902 by selecting via "click" or "double-click" on the "cell" of the OTT application as shown in FIG. 8, such as by using a cursor 808 or any other selection mechanism that may be associated or consistent with a menu-driven interface. The user may navigate the interface 902 as desired, where available content may be itemized according to buckets or tabs such as "New" and "Movies" and "TV" and "Collections" and "My Vudu." The interface 902 may further include a search mechanism under the "Search" tab. Available content may be further itemized under particular buckets or tabs, such as shown in FIG. 9, wherein a user may for example select a la carte TV options for "amc" and etc.

Figure 10:
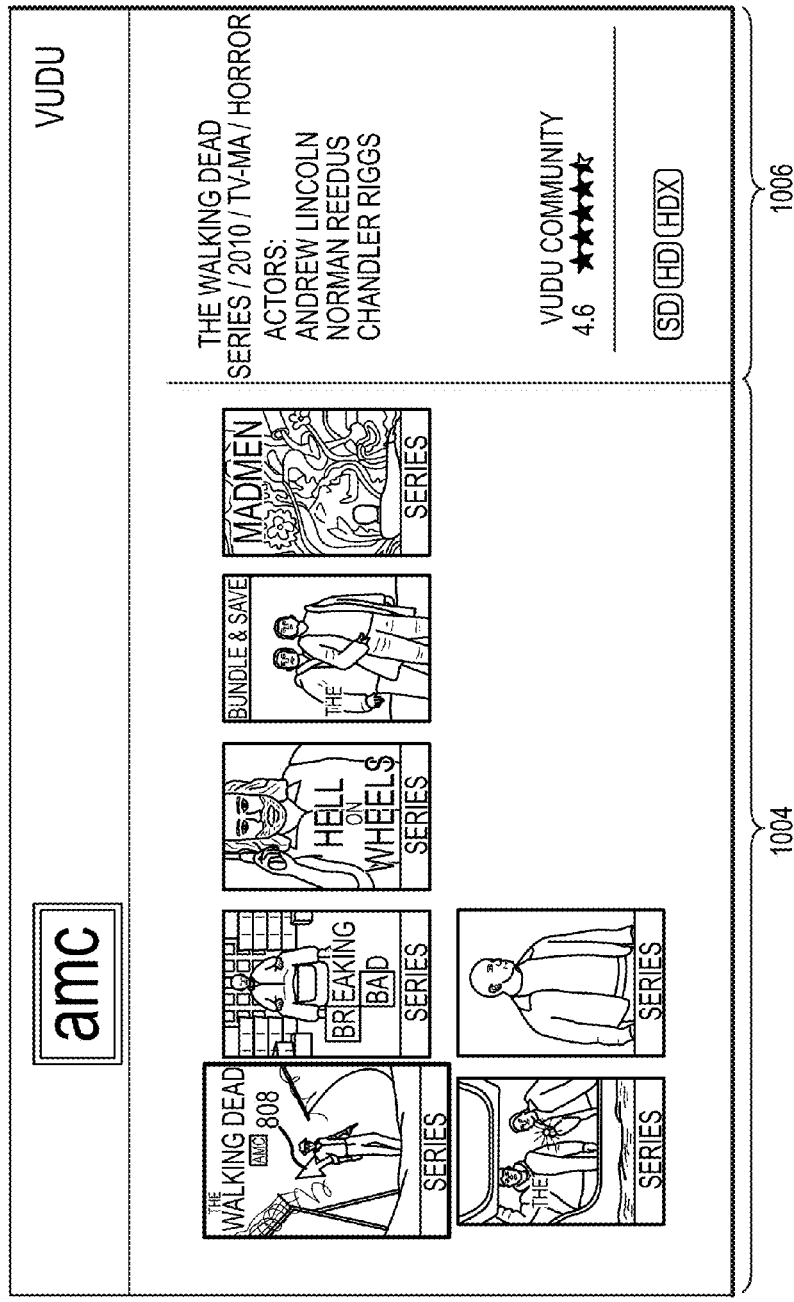
FIG. 10 shows a second screen associated with a service provider application.

For example, referring additionally to FIG. 10, another interface 1002 associated with the particular OTT services provider (i.e., "Vudu") is shown. In this example, it is assumed that the "amc" icon or button as shown in FIG. 9 was selected by a user to access the another interface 1002, where data associated with the another interface 1002 may be transferred from the OTT service provider 118, for example, to one or both of the television 114b and the PTR 110, and subsequently output by at least one of the television 114b and the PTR 110 for presentation by the television 114a. The user may navigate the another interface 1002 as desired, where available content may be itemized or listed within a first pane 1004, and various information related to a particular instance of available content such as, for example, bibliographic information, information related to content type, ratings both motion picture and community, genre, and available quality (e.g., SD, HD, HDX) may be itemized or listed within a second pane 1006. It is contemplated that each of the interfaces as shown in FIGS. 8-10 may be implemented differently and may evolve as interactive interface technology evolves. Further, other information or content may be accessible from the EPG 802 of FIG. 8.

For example, referring now to both FIG. 8 and FIG. 11, it is contemplated that a user may navigate the EPG 802 and access a DVR recordings screen 1102 by selection of an icon 810 within the EPG 802. In general, the DVR recordings screen 1102 may itemize all recordings available or otherwise accessible to the PTR 110 by program name, for example. The DVR recordings screen 1102 may further provide other information such as, for example, date, time, duration, and status of each recording, along with how much storage space is occupied by the recordings (e.g., "84%), as well as status of particular recording (e.g., "New"). In this manner, the EPG 802 may provide one-stop access for or to recorded content, OTA content, OTT content, and etc. As mentioned above, such an EPG may, among other things, serve to entice new customers to subscribe to services as offered by a particular satellite television provider, as well as provide an incentive for existing customers to maintain their loyalty and/or relationship with the particular satellite television provider. However, the hybrid electronic programming guides of the present disclosure many be beneficial and/or advantageous in many other or additional respects.

For example, subscribers may see a clean EPG that has all of their content regardless of source (e.g., OTA, DVR, OTT), an uncluttered EPG at least because not all sub-channels across different OTT providers are shown at once, rather, the user has control over which sub-channels to display, the system could be customized so that the sub-channels that are exposed are done so a particular and preferential and relevant order perhaps in part based on previous viewing habits. In another example, OTT operators may have their respective services exposed to a user every time the receiver is started or when a user accesses the EPG, that is, the subscribers don't have to go to a separate application to be reminded that the subject functionality exists, OTT operators may be permitted to customize the order of sub-channels and/or which sub-channels are displayed if they would like to target specific groups or even particular viewers perhaps based on viewing habits and/or other criteria, OTT operators may apply for or pay for premium or preferential exposure (e.g., "YouTube" may be placed higher in a listing than "ESPN" upon payment), and also may provide OTT operators a new source for demographic information and viewing habits so that they may, for example, target advertising when people tune in to particular content. For example, the sub-channels displayed for a particular OTT provider may vary in content and/or order depending on the particular user utilizing a content receiver.

In another example, broadcast programming services providers may have any number of additional revenue opportunities similar to that described above at least in connection with FIG. 7. For example, in some embodiments, OTT providers may be provided a mechanism for uploading specific and targeted sub-channel information to be displayed on particular groups of receivers, according to the OTT providers' marketing databases. Thus, for example, a family where teenagers are likely to live could be targeted to see newly-released sub-channels that focuses on teen-oriented movies, while a family without children might see a different set of sub-channels. Still other benefits and/or advantageous are possible as well.

Figure 12:
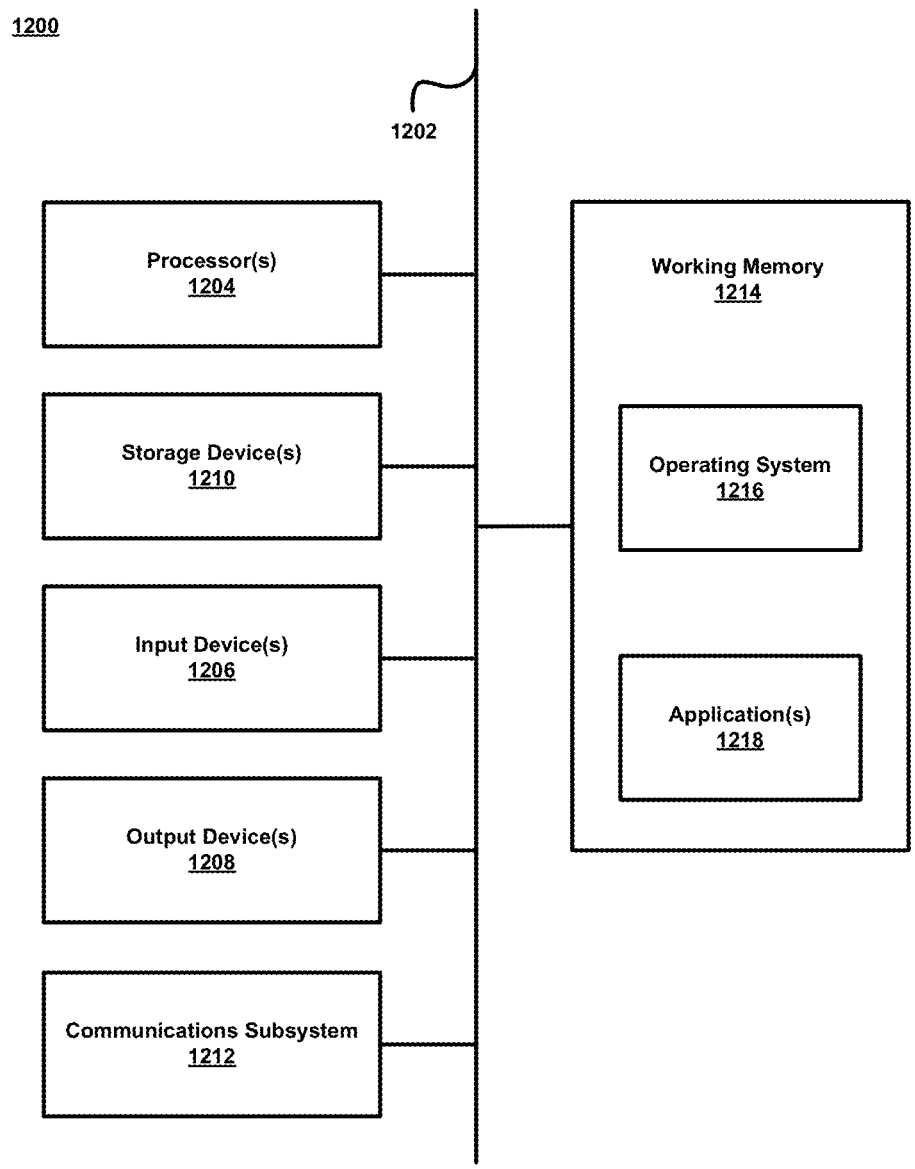
FIG. 12 shows an example computing system or device.

FIG. 12 shows an example computer system or device 1200 in accordance with the disclosure. An example of a computer system or device includes an enterprise server, blade server, desktop computer, laptop computer, tablet computer, personal data assistant, smartphone, gaming console, STB, television receiver, and/or any other type of machine configured for performing calculations. Any particular one of the previously-described computing devices may be wholly or at least partially configured to exhibit features similar to the computer system 1200, such as any of the respective elements of at least FIG. 1. In this manner, any of one or more of the respective elements of at least FIG. 1 may be configured to perform and/or include instructions that, when executed, perform the method of FIG. 6 and/or the method of FIG. 7. Still further, any of one or more of the respective elements of at least FIG. 1 may be configured to perform and/or include instructions that, when executed, instantiate and implement functionality of the PTR 110 and/or the server(s) 118.

The computer device 1200 is shown comprising hardware elements that may be electrically coupled via a bus 1202 (or may otherwise be in communication, as appropriate). The hardware elements may include a processing unit with one or more processors 1204, including without limitation one or more general-purpose processors and/or one or more special-purpose processors (such as digital signal processing chips, graphics acceleration processors, and/or the like); one or more input devices 1206, which may include without limitation a remote control, a mouse, a keyboard, and/or the like; and one or more output devices 1208, which may include without limitation a presentation device (e.g., television), a printer, and/or the like.

The computer system 1200 may further include (and/or be in communication with) one or more non-transitory storage devices 1210, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 1200 might also include a communications subsystem 1212, which may include without limitation a modem, a network card (wireless and/or wired), an infrared communication device, a wireless communication device and/or a chipset such as a Bluetooth™ device, 1202.11 device, WiFi device, WiMax device, cellular communication facilities such as GSM (Global System for Mobile Communications), W-CDMA (Wideband Code Division Multiple Access), LTE (Long Term Evolution), etc., and/or the like. The communications subsystem 1212 may permit data to be exchanged with a network (such as the network described below, to name one example), other computer systems, and/or any other devices described herein. In many embodiments, the computer system 1200 will further comprise a working memory 1214, which may include a random access memory and/or a read-only memory device, as described above.

The computer device 1200 also may comprise software elements, shown as being currently located within the working memory 1214, including an operating system 1216, device drivers, executable libraries, and/or other code, such as one or more application programs 1218, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 1210 described above. In some cases, the storage medium might be incorporated within a computer system, such as computer system 1200. In other embodiments, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 1200 and/or might take the form of source and/or installable code, which, upon compilation and/or installation on the computer system 1200 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 1200) to perform methods in accordance with various embodiments of the disclosure. According to a set of embodiments, some or all of the procedures of such methods are performed by the computer system 1200 in response to processor 1204 executing one or more sequences of one or more instructions (which might be incorporated into the operating system 1216 and/or other code, such as an application program 1218) contained in the working memory 1214. Such instructions may be read into the working memory 1214 from another computer-readable medium, such as one or more of the storage device(s) 1210. Merely by way of example, execution of the sequences of instructions contained in the working memory 1214 may cause the processor(s) 1204 to perform one or more procedures of the methods described herein.

The terms "machine-readable medium" and "computer-readable medium," as used herein, may refer to any non-transitory medium that participates in providing data that causes a machine to operate in a specific fashion. In an embodiment implemented using the computer device 1200, various computer-readable media might be involved in providing instructions/code to processor(s) 1204 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 1210. Volatile media may include, without limitation, dynamic memory, such as the working memory 1214.

Example forms of physical and/or tangible computer-readable media may include a floppy disk, a flexible disk, hard disk, magnetic tape, or any other magnetic medium, a compact disc, any other optical medium, ROM (Read Only Memory), RAM (Random Access Memory), and etc., any other memory chip or cartridge, or any other medium from which a computer may read instructions and/or code. Various forms of computer-readable media may be involved in carrying one or more sequences of one or more instructions to the processor(s) 1204 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 1200.

The communications subsystem 1212 (and/or components thereof) generally will receive signals, and the bus 1202 then might carry the signals (and/or the data, instructions, etc. carried by the signals) to the working memory 1214, from which the processor(s) 1204 retrieves and executes the instructions. The instructions received by the working memory 1214 may optionally be stored on a non-transitory storage device 1210 either before or after execution by the processor(s) 1204.

It should further be understood that the components of computer device 1200 can be distributed across a network. For example, some processing may be performed in one location using a first processor while other processing may be performed by another processor remote from the first processor. Other components of computer system 1200 may be similarly distributed. As such, computer device 1200 may be interpreted as a distributed computing system that performs processing in multiple locations. In some instances, computer system 1200 may be interpreted as a single computing device, such as a distinct laptop, desktop computer, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
    outputting for presentation by a display device and within an interactive electronic programming guide a continuously updated menu of programming provided to at least one television receiver by at least one broadcast programming provider, the interactive electronic programming guide comprising a left-most column of channel descriptions, and a plurality of columns positioned right of the left-most column comprising time-based programming information;

simultaneously outputting for presentation by the display device and within the interactive electronic programming guide a continuously updated menu of over-the-top (OTT) content provided to the at least one television receiver by at least one OTT service provider, wherein at least one row of the left-most column comprises a selection for a provider of OTT content, wherein the at least one row comprising OTT content further comprises a selectable icon overlaid within the at least one left-most column of the at least one row comprising OTT content; and generating, in response to a user selection of the selectable icon, additional rows of content associated with the provider of OTT content within the continuously updated menu of programming of the interactive electronic programming guide without switching to a different interface or screen, the additional rows comprising multiple channel descriptions of additional selectable content from the provider of OTT content.

2. The method of claim 1, further comprising:
detecting selection within an interactive pane of a particular instance of content provided by a particular OTT service provider;
receiving data, provided by the particular OTT service provider to the at least one television receiver over a broadband connection, associated with the particular instance of content; and
outputting for presentation by the display device the data associated with the particular instance of content.

3. The method of claim 1, further comprising:
detecting invocation of a particular command to return to an interactive pane that identifies at least one instance of content provided by a particular OTT service provider; and
generating, in response to detecting invocation of the particular command and for presentation by the display device and within the interactive electronic programming guide, the interactive pane that identifies at least one instance of content provided by the particular OTT service provider.

4. The method of claim 1, further comprising:
monitoring selection of OTT content within an interactive pane; and
intermittently or periodically reporting, based on the monitoring, OTT content selection data to a computing system associated with a satellite television service provider over a broadband connection, wherein the OTT content selection data comprises a number of times each particular instance of OTT content has been selected by a user.

5. The method of claim 1, further comprising:
monitoring selection of advertising content within an interactive pane; and
intermittently or periodically reporting, based on the monitoring, advertising content selection data to a computing system associated with a satellite television service provider over a broadband connection.

6. The method of claim 1, further comprising:
monitoring selection of the selectable icon associated with a particular OTT service provider within the interactive electronic programming guide; and
intermittently or periodically reporting, based on the monitoring, OTT service provider selection data to a computing system associated with a satellite television service provider over a broadband connection, wherein the OTT service provider selection data comprises a number of times the selectable icon has been selected by a user.

7. The method of claim 1, further comprising:
outputting for display within the interactive electronic programming guide a selectable icon positioned in association with a descriptor that identifies a particular OTT service provider; and
generating, in response to user selection of the selectable icon and for presentation by the display device and within the interactive electronic programming guide, an interactive pane that identifies content provided by the particular OTT service provider grouped according to a particular content type.

8. The method of claim 1, further comprising:
outputting for display within the interactive electronic programming guide a selectable icon positioned in association with a descriptor that identifies a particular OTT service provider; and
generating, in response to user selection of the selectable icon and for presentation by the display device and within the interactive electronic programming guide, an interactive pane associated with a content delivery and media technology service that distributes content to devices over a broadband network connection.

9. The method of claim 1, further comprising:
outputting for presentation by the display device and within the interactive electronic programming guide the continuously updated menu of programming provided to the at least one television receiver by a satellite television provider and at least one over-the-air television provider.

10. The method of claim 1, further comprising:
outputting for presentation by the display device and within the interactive electronic programming guide an icon that when selected activates the at least one television receiver to generate a guide for presentation by the display device that itemizes recorded program content accessible to the at least one television receiver.

11. A television receiver, comprising:
one or more processors; and
a memory communicatively coupled with and readable by the one or more processors and having stored therein processor-readable instructions that, when executed by the one or more processors, cause the one or more processors to:
output for presentation by a display device and within an interactive electronic programming guide a continuously updated menu of programming provided to at least one television receiver by at least one broadcast programming provider, the interactive electronic programming guide comprising a left-most column of channel descriptions, and a plurality of columns positioned right of the left-most column comprising time-based programming information;
simultaneously output for presentation by the display device and within the interactive electronic programming guide a continuously updated menu of over-the-top (OTT) content provided to the at least one television receiver by at least one OTT service provider, wherein at least one row of the left-most column comprises a selection for a provider of OTT content, wherein the at least one row comprising OTT content further comprises a selectable icon overlaid within the left-most column of the at least one row comprising OTT content; and generate, in response to a user selection of the selectable icon, additional rows of content associated with the provider of OTT content without switching to a different interface or screen, the additional rows comprising multiple channel descriptions of additional selectable content from the provider of OTT content.

12. The television receiver of claim 11, wherein the memory having stored therein processor-readable instructions which, when executed by the one or more processors, cause the one or more processors to:
monitor selection of OTT content within an interactive pane; and
intermittently or periodically report, based on the monitoring, OTT content selection data to a computing system associated with a satellite television service provider over a broadband connection.

13. The television receiver of claim 11, wherein the memory having stored therein processor-readable instructions which, when executed by the one or more processors, cause the one or more processors to:
monitor selection of advertising content within an interactive pane; and
intermittently or periodically report, based on the monitoring, advertising content selection data to a computing system associated with a satellite television service provider over a broadband connection.

14. The television receiver of claim 11, wherein the memory having stored therein processor-readable instructions which, when executed by the one or more processors, cause the one or more processors to:
monitor selection of an icon associated with a particular OTT service provider within the interactive electronic programming guide; and
intermittently or periodically report, based on the monitoring, OTT service provider selection data to a computing system associated with a satellite television service provider over a broadband connection.

15. The television receiver of claim 11, wherein the memory having stored therein processor-readable instructions which, when executed by the one or more processors, cause the one or more processors to:
output for display within the interactive electronic programming guide a selectable icon positioned in association with a descriptor that identifies a particular OTT service provider; and
generate, in response to user selection of the selectable icon and for presentation by the display device and within the interactive electronic programming guide, an interactive pane associated with a content delivery and media technology service that distributes content to devices over a broadband network connection.

16. The television receiver of claim 11, wherein the memory having stored therein processor-readable instructions which, when executed by the one or more processors, cause the one or more processors to:
output for presentation by the display device and within the interactive electronic programming guide the continuously updated menu of programming provided to the television receiver by a satellite television provider and at least one over-the-air television provider.

17. The television receiver of claim 11, wherein the memory having stored therein processor-readable instructions which, when executed by the one or more processors, cause the one or more processors to:
detect selection within an interactive pane of a particular instance of content provided by a particular OTT service provider;
receive data, provided by the particular OTT service provider to the television receiver over a broadband connection, associated with the particular instance of content; and
output for presentation by the display device the data associated with the particular instance of content.

18. A computer-implemented method, comprising
outputting for presentation by a display device and within an interactive electronic programming guide a continuously updated menu of programming provided to at least one television receiver by at least one broadcast programming provider;
simultaneously outputting for presentation by the display device and within the interactive electronic programming guide a continuously updated menu of over-the-top (OTT) content provided to the at least one television receiver by at least one OTT service provider;
monitoring selection of an icon associated with the at least one OTT service provider within the interactive electronic programming guide, wherein the icon is overlaid on a program identifier for the OTT content, and the selection of the icon causes generating additional rows of content associated with the at least one OTT provider within the interactive electronic programming guide without switching to a different interface or screen; and
intermittently or periodically reporting, based on the monitoring, OTT service provider selection data to a computing system associated with a satellite television service provider over a broadband connection, wherein the OTT service provider selection data comprises a number of times the icon has been selected by a user.

19. The method of claim 18, wherein the icon, when selected, is configured to produce a drop-down list of sub-channels of the OTT service provider.

20. The method of claim 1, wherein the generated additional rows are inserted within the interactive electronic programming guide below the at least one row comprising OTT content.

* * * * *